United States Patent [19]

Fischer

[11] Patent Number: 5,609,453
[45] Date of Patent: Mar. 11, 1997

[54] EXPANSIBLE PLUG FOR ANCHORING IN A DRILLED HOLE HAVING AN UNDERCUT

[75] Inventor: Artur Fischer, Waldachtal, Germany

[73] Assignee: fischerwerke, Artur Fischer GmbH & Co AG, Waldachtal, Germany

[21] Appl. No.: 593,787

[22] Filed: Jan. 30, 1996

[30] Foreign Application Priority Data

Feb. 9, 1995 [DE] Germany ............ 195 04 216.6

[51] Int. Cl.$^6$ .................................................. F16B 13/06
[52] U.S. Cl. .............................. 411/54; 411/60; 411/908
[58] Field of Search ............................. 411/54, 55, 57, 411/60, 61, 42, 908

[56] References Cited

U.S. PATENT DOCUMENTS

| | | | |
|---|---|---|---|
| 4,763,396 | 8/1988 | Fischer | 411/54 X |
| 4,818,163 | 4/1989 | Bereiter et al. | 411/54 X |
| 4,984,945 | 1/1991 | Bergner | 411/60 X |
| 5,013,192 | 5/1991 | Scott | 411/60 X |

FOREIGN PATENT DOCUMENTS

| | | |
|---|---|---|
| 2909749 | 3/1979 | Germany . |
| 3031048 | 8/1980 | Germany . |
| 3124685 | 6/1981 | Germany . |
| 3146027 | 11/1981 | Germany . |
| 654080 | 2/1982 | Switzerland . |

*Primary Examiner*—Neill R. Wilson
*Attorney, Agent, or Firm*—Michael J. Striker

[57] ABSTRACT

An expansible plug for anchoring in a drilled hole having an undercut, comprises a threaded bolt having a leading end with an expander cone at the leading end, an expansible sleeve having a leading end and a rear end and provided with a plurality of longitudinal slits starting from the leading end of the expansible sleeve and extending for a part of a length of the expansible sleeve. The expansible sleeve has a cylindrical portion arranged at the leading end of the expansible sleeve, and also an annular groove adjoining the cylindrical portion and tapering toward the rear end of the expansible sleeve. The groove is bounded in a region of the slits by a rounded portion. The expansible sleeve is composed of a fiber-reinforced, high-strength plastic material.

5 Claims, 1 Drawing Sheet

EXPANSIBLE PLUG FOR ANCHORING IN A DRILLED HOLE HAVING AN UNDERCUT

BACKGROUND OF THE INVENTION

The present invention relates to an expansible plug for anchoring in a drilled hole having an undercut, consisting of a threaded bolt and an expansible sleeve.

Expansible plugs of the above mentioned general type are known in the art. DE 31 24 685 C2 discloses an expansible plug which consists of a threaded bolt having an expander cone at its leading end, and an expansible sleeve which has longitudinal slits starting from its leading end and extending for a part of its length. To anchor the expansible plug in a drilled hole having an undercut at the bottom thereof, the expansible sleeve is driven onto the expander cone of the threaded bolt which bears against the bottom of the drilled hole. During this process, the expansible segments of the expansible sleeve that are created by the longitudinal slits are bent into the undercut. The result is therefore an interlocking anchorage, which, by virtue of the expansible segments bent into the undercut, is able to compensate for any enlargement of the drilled hole as a result of cracks forming. The known expansible plug is then used in particular in the case of anchorings in the tensile zone in which cracks commonly form.

The known expansible plugs possess some disadvantages.

The function of the known expansible plug is impaired, however, if dynamic loads act on the plug or the anchoring substrate is subjected to dynamic loads. Because the plug and the anchoring substrate are being constantly subjected to stress and relieved of stress, the cracks close and open, so that as a consequence of the constant change in the expansion pressure exerted by the wall of the drilled hole on the expansible sleeve, the wall of the drilled hole is gradually reamed out in the anchoring region by the hard expansible sleeve which consists of metal.

SUMMARY OF THE INVENTION

Accordingly, it is an object of the present invention to provide an expansible plug for anchoring in a drilled hole having an undercut, which avoids the disadvantages of the prior art.

More particularly, it is an object of the present invention to provide an expansible plug for anchoring in a drilled hole having an undercut, which is suitable for fixing in the dynamically loaded tensile zone and/or for absorbing dynamic loads.

In keeping with these objects and with others which will become apparent hereinafter, one feature of the present invention resides, briefly stated, in an expansible plug for anchoring in a drilled hole having an undercut, including a threaded bolt having an expander cone at the leading end thereof, and expansible sleeve which has longitudinal slits starting from its leading end extending for a part of its length, wherein in accordance with the present invention adjoining a cylindrical portion arranged at the leading end of the expansible sleeve there is an annular groove which tapers toward the rear end of the expansible sleeve, and the groove is bounded in the region of the slit and by a rounded portion, and also at least the expansible sleeve consists of a fiber-reinforced, high-strength plastic material.

When the expansible plug is designed in accordance with the present invention, it avoids the disadvantages of the prior art and provides for highly advantageous results specified hereinabove.

By the use of a fiber-reinforced, high-strength plastic material for the expansible sleeve in place of metal, in a drilled hole having an undercut the interlocking engagement similarly provides adequately high holding values by virtue of the high compressive strength and creep resistance of the plastic material. Because of the lower hardness of the plastic material compared with metal and its better sliding properties, however, reaming out of the drilled hole resulting from constant opening and closing of the crack when dynamic loads occur is avoided. The forces acting on the expansible sleeve through the wall of the drilled hole are absorbed by the resilience of the material on the one hand, and by slight axial movements of the expansible sleeve on the expander cone on the other hand.

The use of the fiber-reinforced, high-strength plastic material for the expansible sleeve requires, however, a construction of the expansible sleeve which allows expansion of the expansible plug in a drilled hole having an undercut. According to the invention, that is achieved in that adjoining a cylindrical portion arranged at the leading end of the expansible sleeve there is an annular groove tapering towards the rear end of the expansible sleeve, which groove is bounded in the region of the end of the slit by a rounded portion. This construction produces a cross-sectional weakening acting as a joint, which allows the expansible segments created by the longitudinal slits to bend without breaking. The outer surface of the cylindrical portion of the expansible sleeve thus comes to bear against the wall of the V-shaped undercut, whilst the end of the annular groove lies in the region of the cylindrical part of the drilled hole.

In accordance with another feature of the present invention an especially suitable material has proved to be a partially or fully aromatic, glass fiber-reinforced or carbon fiber-reinforced polyamide or polycarbonate, the tensile strength of which is at least 100 N/mm$^2$.

In accordance with still another feature of the present invention an advantageous outward bending of the expansible segments is achieved in that the smallest diameter of the annular groove corresponds approximately to the mean diameter of the difference between the external diameter and the internal diameter of the expansible sleeve.

In accordance with a further feature of the present invention, a face-to-face engagement of the expansible segments with the wall of the undercut can be achieved in that the length of the cylindrical portion at the leading end of the expansible sleeve corresponds approximately to the diameter of the internal bore and the length of the annular groove corresponds approximately to the external diameter of the expansible sleeve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
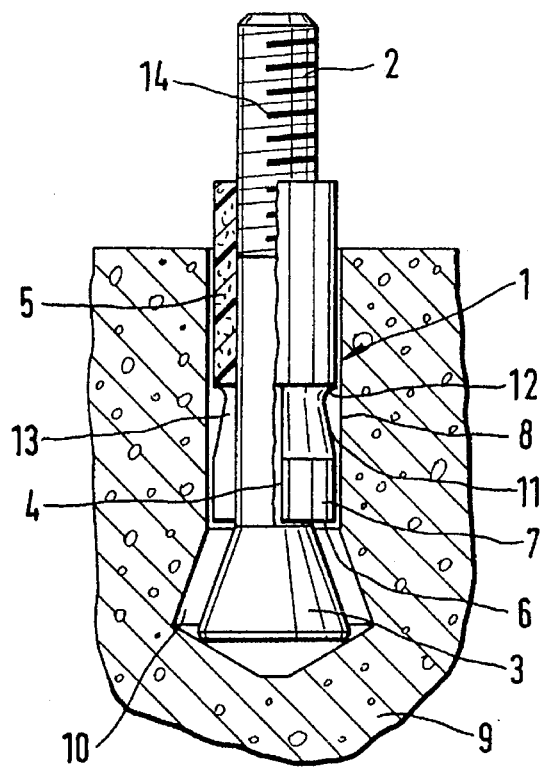
FIG. 1 shows the expansible plug in partial longitudinal section before anchoring.

An expansible plug 1 includes a threaded bolt 2 with cone-shaped expander cone 3, and an expansible sleeve 5 provided for part of its length with longitudinal slits 4. The expansible sleeve 5 is positioned over the threaded bolt 2 with the leading end 6 of the expansible sleeve 5 resting on the expander cone 3. At the leading end of the expansible sleeve 5 there is provided a cylindrical portion 7, the external diameter of which corresponds approximately to the cylindrical part of the drilled hole 8. In the region of the bottom of the drilled hole, the drilled hole 8 has an undercut 10 in the anchoring substrate 9. Adjoining the cylindrical portion 7 of the expansible sleeve 5 there is an annular groove 11, which tapers towards the rear end of the expansible sleeve 5. The annular groove 11 is bounded by a rounded portion 12.

The annular groove 11 produced a cross-sectional weakening 13 which acts as a joint when the expansible segments formed by the longitudinal slits 4 bend outward. The ease of expansion enable the expansible sleeve 5 to be manufactured from a fiber-reinforced, high-strength plastic material, for example, from a partially or fully aromatic, glass fiber-reinforced or carbon fiber-reinforced polyamide or polycarbonate having a minimum tensile strength of 100 N/mm$^2$.

Figure 2:
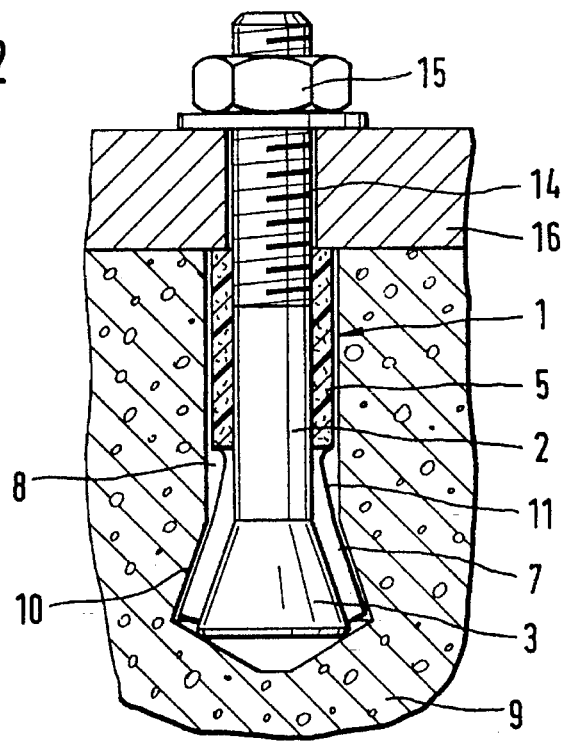
FIG. 2 shows the expansible plug of FIG. 1 in longitudinal section after anchoring.

In FIG. 2, the expansible plug 1 shown in FIG. 1 is illustrated after anchoring. Anchoring of the expansible plug is effected by driving the expansible sleeve 5, by means of a driving-in tool (not illustrated), onto the expander cone 3 of the threaded bolt 2 bearing against the bottom of the drilled hole. As a result, the cylindrical portion 7 of the expansible sleeve 5 slides onto the expander cone 3 and fills the gap between the expander cone 3 and the wall of the undercut 1. This produces an interlocking anchoring of the expansible plug 1 in the drilled hole 8 of the anchoring substrate 9. After anchoring, an article 16 can be fixed on the thread 14 of the threaded bolt 2 by means of a nut 15.

It will be understood that each of the elements described above, or two or more together, may also find a useful application in other types of constructions differing from the types described above.

While the invention has been illustrated and described as embodied in an expansible plug for anchoring in a drilled hole having an undercut, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. An expansible plug for anchoring in a drilled hole having an undercut, the plug comprising a threaded bolt having a leading end with an expander cone at said leading end; an expansible sleeve having a leading end and a rear end and provided with a plurality of longitudinal slits starting from said leading end of said expansible sleeve and extending for a part of a length of said expansible sleeve, said expansible sleeve having a cylindrical portion arranged at said leading end of said expansible sleeve, said expansible sleeve also having an annular groove adjoining said cylindrical portion and tapering toward said rear end of said expansible sleeve, said groove being bounded in a region of said slits by a rounded portion, said expansible sleeve being composed of a fiber-reinforced, high-strength plastic material.

2. An expansible plug as defined in claim 1, wherein said plastic material is a material selected from the group consisting of at least partially aromatic polyamide and polycarbonate which is reinforced by fibers selected from the group consisting of glass fibers and carbon fibers, with a minimum tensile strength of 100 N/mm$^2$.

3. An expansible plug as defined in claim 1, wherein said plastic material is a material selected from the group consisting of fully aromatic polyamide and polycarbonate which is reinforced by fibers selected from the group consisting of glass fibers and carbon fibers, with a minimum tensile strength of 100 N/mm$^2$.

4. An expansible plug as defined in claim 1, wherein said expansible sleeve has an external diameter and an internal diameter, said annular groove having a smaller diameter which approximately corresponds to a mean diameter of a difference between said external diameter and said internal diameter of said expansible sleeve.

5. An expansible plug as defined in claim 1, wherein said annular groove has a length substantially corresponding to an external diameter of said expansible sleeve.

\* \* \* \* \*